United States Patent
Yin et al.

(10) Patent No.: US 11,327,386 B1
(45) Date of Patent: May 10, 2022

(54) ALL-OPTICAL OPTICAL PARAMETRIC OSCILLATOR

(71) Applicant: Chengdu University of Technology, Chengdu (CN)

(72) Inventors: Ming Yin, Chengdu (CN); Yongzhi Luo, Chengdu (CN); Xiyue Lin, Chengdu (CN)

(73) Assignee: CHENGDU UNIVERSITY OF TECHNOLOGY, Chengdu (CN)

( * ) Notice: Subject to any disclaimer, the term of this patent is extended or adjusted under 35 U.S.C. 154(b) by 0 days.

(21) Appl. No.: 17/319,104

(22) Filed: May 13, 2021

(30) Foreign Application Priority Data

Nov. 23, 2020 (CN) .......................... 202011321961.4

(51) Int. Cl.
  *G02F 1/39* (2006.01)
  *G02F 1/35* (2006.01)
  (Continued)

(52) U.S. Cl.
  CPC ............. *G02F 1/395* (2013.01); *G02F 1/3503* (2021.01); *G02F 1/3558* (2013.01); *G02F 1/37* (2013.01)

(58) Field of Classification Search
  CPC .................................. G02F 1/395; G02F 1/397
  See application file for complete search history.

(56) References Cited

U.S. PATENT DOCUMENTS

| | | | | |
|---|---|---|---|---|
| 6,167,067 A * | 12/2000 | Meyer, Jr | ................... | G02F 1/39 372/21 |
| 7,436,579 B1 * | 10/2008 | Huang | ................... | G02F 1/3558 359/326 |
| 8,508,841 B2 * | 8/2013 | Chou | ................... | G02F 1/3501 359/328 |

FOREIGN PATENT DOCUMENTS

| | | |
|---|---|---|
| CN | 1560333 A | 1/2005 |
| CN | 101592604 A | 12/2009 |

(Continued)

OTHER PUBLICATIONS

R. R. Sahoo, M. K. Shukla and R. Das, "Thermo-Optic Effects in Congruent-LiTaO3 Based Continuous-Wave Optical Parametric Oscillator," in IEEE Photonics Technology Letters, vol. 33, No. 19, pp. 1069-1072, 1 Oct. 1, 2021, doi: 10.1109/LPT.2021.3103761. (Year: 2021).*

(Continued)

*Primary Examiner* — Rhonda S Peace (74) *Attorney, Agent, or Firm* — Bayramoglu Law Office LLC (57) ABSTRACT

An all-optical optical parametric oscillator includes a laser module, a temperature control module, a plurality of filters and a beam splitter arranged in sequence. A bulk material or waveguide material is arranged in the temperature control module. Both ends of the bulk material are provided with a first OPO cavity mirror $M_1'$ and a second OPO cavity mirror $M_2'$. Each of the first OPO cavity mirror $M_1'$ and the second OPO cavity mirror $M_2'$ is coated with a high-reflectivity film with respect to an OPO signal light and an OPO idler light, and coated with a high-transmittance film with respect to an OPO pump light, a poling fundamental frequency light and a poling frequency doubled light. The temperature of the material is changed by changing the temperature of the temperature control module to realize temperature tuning of wavelength $\lambda_s$ of the OPO signal light and wavelength $\lambda_i$ of the OPO idler light.

20 Claims, 6 Drawing Sheets

(51) Int. Cl.
 *G02F 1/37* (2006.01)
 *G02F 1/355* (2006.01)

(56) References Cited

FOREIGN PATENT DOCUMENTS

| CN | 101887203 A | 11/2010 |
| CN | 107092152 A | 8/2017 |
| CN | 108267301 A | 7/2018 |

OTHER PUBLICATIONS

D. Descloux, J.—. Dherbecourt, J.—. Melkonian, M. Raybaut, C. Drag and A. Godard, "Fast tunable picosecond optical parametric oscillator based on chirped quasi-phase matching," 2015 Conference on Lasers and Electro-Optics (CLEO), 2015, pp. 1-2, doi: 10.1364/CLEO_SI.2015.SW1O.5. (Year: 2015).*

Q. Li, J. Tian, X. Zhang, Y. Song and L. Wang, "Intracavity frequency doubling of PPKTP-based optical parametric oscillator," 2011 Asia Communications and Photonics Conference and Exhibition (ACP), 2011, pp. 1-6, doi: 10.1117/12.903968. (Year: 2011).*

* cited by examiner

ALL-OPTICAL OPTICAL PARAMETRIC OSCILLATOR

CROSS REFERENCE TO THE RELATED APPLICATIONS

This application is based upon and claims priority to Chinese Patent Application No. 202011321961.4, filed on Nov. 23, 2020, the entire contents of which are incorporated herein by reference.

TECHNICAL FIELD

The present invention relates to the technical field of photoelectric integration, in particular to an all-optical optical parametric oscillator.

BACKGROUND

Figure 1A:
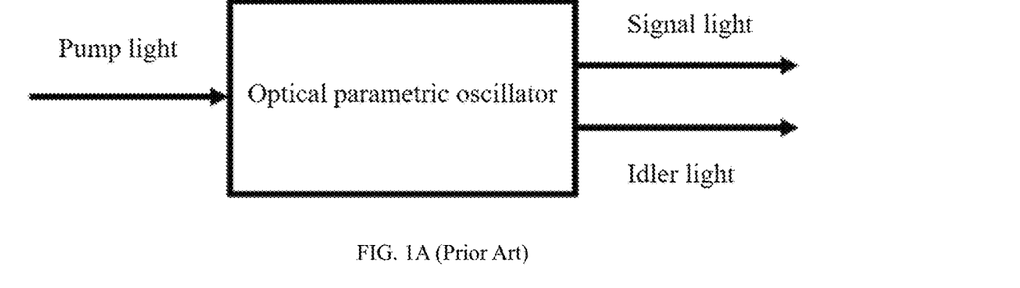
FIG. 1A is a schematic diagram of the structure of an optical parametric oscillator in the prior art.

Optical parametric oscillation (OPO) converts a laser light (called pump light) with an input wavelength of $\lambda_p$ into two beams with unequal wavelengths by means of second-order nonlinear optical effect. Among these two beams, the beam with a shorter wavelength is called the signal light $\lambda_s$, while the beam with a longer wavelength is called the idler light $\lambda_i$. The wavelength of the pump light is shorter than the wavelength of each of the signal light and the idler light, as shown in FIG. 1(a). In the process of parametric oscillation, due to the dispersion effect of nonlinear medium materials, light waves of different frequencies have different propagation speeds and refractive indices when propagating in the medium, which causes light waves with the same initial phase but different frequencies to generate a phase difference during propagation. When the three interacting light waves propagate a certain distance (coherence length) in the medium, the phase difference of the three light waves will exceed $\pi$. At this time, the intensity of newly generated light waves will not continue to increase, but will transform in the opposite direction. In order to increase the coherence length and improve the efficiency of nonlinear frequency conversion, the interacting light waves are typically required to meet the phase matching condition in the medium.

Figure 1B:
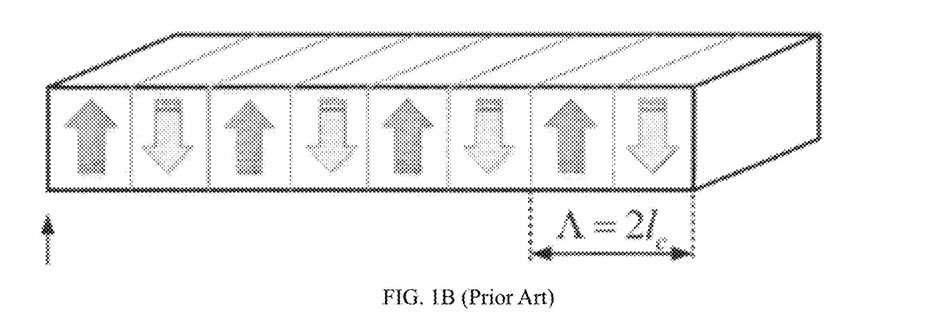
FIG. 1B is a schematic diagram of the periodically poled crystal in quasi-phase matching.

Quasi-phase-matching is a technique that uses periodically poled crystals to periodically change the spontaneous polarization direction of the crystals to compensate for a phase mismatch generated in the nonlinear crystals due to different wavelengths of the interacting light waves. This compensation method enables the light wave to always perform optical parametric conversion along a specific direction, as shown in FIG. 1(b), $\Lambda$ is the poled period of the nonlinear crystal, and $l_c$ is the length of the inversion domain. At this time, the phase mismatch amount in the optical parametric conversion process is:

$$\Delta k_{QPM} = k_p - k_s - k_i - \frac{2\pi m}{\Lambda},$$

where m is the order, and is an odd number (1, 3, 5 . . . ). Therefore, to satisfy the phase mismatch amount $\Delta k_{QPM}=0$, the poledperiod of the nonlinear crystal only needs to meet the following condition:

$$\Lambda = \frac{2\pi m}{k_p - k_s - k_i}.$$

Methods for poling quasi-phase-matched OPO nonlinear crystals mainly include: a scattered sheet adhesion method, in which micron-sized sheets are prepared and then adhered together in a certain way; a growth method, in which the temperature and other factors during crystal growth are controlled to achieve domain inversion and periodic overlapping growth; and a proton exchange method, in which a strong acid is used as a proton source in the proton exchanging process, so that $Li^+$ in lithium niobate will be completely replaced by $H^+$ in the solution, thereby destroying the physical structure of the crystal itself, if a weak acid is used as the proton source, only part of the $Li^+$ in the lithium niobate will be replaced by the $H^+$ in the solution, thereby maintaining the original structure and performance of the crystal. However, due to the shallow diffusion layer in the proton exchange method, the prepared crystal has a shallow inversion domain, and therefore this method cannot prepare large-sized quasi-phase-matched crystals. In view of this, an electronic scanning method is proposed, in this method, the surface of the positive domain of the crystal is coated with a gold film as a grounding electrode, and the electron beam of the scanning electron microscope is used to scan the surface of the negative domain; the scanned sample is corroded in a strong acid for several minutes, this method can prepare large-volume quasi-phase-matched crystals at a low cost, but has a low repetition rate and thus is difficult to prepare uniform domain inverted gratings. The high-voltage electric field poling method is commonly used for poling quasi-phase-matched OPO nonlinear crystals, in this method, a high-voltage electric field is applied outside the nonlinear crystal, the metal grid electrode is grounded on the positive domain surface of the crystal, and the metal plane electrode on the negative domain surface is connected to a power source.

The prior art mainly uses electric poling to periodically pole some nonlinear materials to obtain periodically poled nonlinear crystals like periodically poled lithium niobate (PPLN), periodically poled lithium tantalate (PPLT), periodically poled potassium titanyl arsenate (PPKTA) and periodically poled rubidium titanyl arsenate (PPRTA), and then the above-mentioned periodically poled nonlinear crystal is put into the OPO resonator and used as a nonlinear medium to realize quasi-phase-matching OPO. The quasi-phase-matched OPO nonlinear material has an unchangeable poled period after being poled. The poling of nonlinear materials adopts electrical methods, which cannot achieve "all-optical". The existing quasi-phase-matched OPO nonlinear materials with periodic structures generated by means of electric poling face many limitations when integrated in silicon optical circuits.

SUMMARY

In view of the above-mentioned shortcomings in the prior art, the present invention provides an all-optical optical parametric oscillator, which solves the following problems: the poled period of the quasi-phase-matched OPO nonlinear crystal cannot be dynamically changed; the quasi-phase-matched OPO nonlinear crystal cannot be periodically poled by laser irradiation; and the quasi-phase-matched OPO nonlinear material is difficult to be integrated in the silicon optical circuit.

In order to achieve the above-mentioned objective, the present invention adopts the following technical solutions.

The present solution provides an all-optical optical parametric oscillator, including a laser module, a temperature control module, a plurality of filters and a beam splitter arranged in sequence. A bulk material or a waveguide material is arranged in the temperature control module.

Both ends of the bulk material are provided with a first OPO cavity mirror $M_1'$ and a second OPO cavity mirror $M_2'$, respectively. Each of the first OPO cavity mirror $M_1'$ and the second OPO cavity mirror $M_2'$ is coated with a high-reflectivity film with respect to an OPO signal light and an OPO idler light, and is coated with a high-transmittance film with respect to an OPO pump light, a poling fundamental frequency light and a poling frequency doubled light.

Each of both ends of the waveguide material is coated with a high-reflectivity film with respect to the OPO signal light and OPO idler light, and is coated with a high-transmittance film with respect to the OPO pump light, the poling fundamental frequency light and the poling frequency doubled light.

Further, the laser module is a first laser unit, a second laser unit, a third laser unit or a fourth laser unit.

Further, the first laser unit includes a first laser L1, a second laser L2, a first reflector $M_1''$, and a second reflector $M_2''$.

The poling fundamental frequency light is emitted by the second laser L2, and then incident on the bulk material through the first reflector $M_1''$ and the second reflector $M_2''$, so that the bulk material produces a second-order nonlinear coefficient to generate the poling frequency doubled light by means of the second-order nonlinear effect, and the material produces a periodic second-order nonlinear coefficient under the combined action of the poling fundamental frequency light and the poling frequency doubled light. The OPO pump light is emitted by the first laser L1, and then incident on the bulk material through the second reflector $M_2''$ to generate the OPO signal light and the OPO idler light by means of the nonlinear effect of the bulk material. The poling fundamental frequency light, the poling frequency doubled light, the OPO pump light, the OPO signal light, and the OPO idler light pass through a filter M1, a filter M2 and a filter M3 to filter the poling fundamental frequency light, the poling frequency doubled light and the OPO pump light, to obtain the OPO idler light and the OPO signal light. The OPO idler light and the OPO signal light are separated by the beam splitter. The filter M1, the filter M2 and the filter M3 are arranged in sequence, and the filter M1 is arranged behind the temperature control module. The third filter M3 is arranged in front of the beam splitter.

Further, the second laser unit includes a third laser L3.

The poling fundamental frequency light is emitted by the third laser L3, and then incident on the bulk material, so that the bulk material produces a second-order nonlinear coefficient to generate the poling frequency doubled light by means of the second-order nonlinear effect, and the material produces a periodic second-order nonlinear coefficient under the combined action of the poling fundamental frequency light and the poling frequency doubled light. The OPO pump light is emitted by the third laser L3, and then incident on the bulk material to generate the OPO signal light and the OPO idler light by means of the nonlinear effect of the bulk material. The poling fundamental frequency light and the OPO pump light are filtered through the filter M1, and the poling frequency doubled light is filtered through the filter M2, to obtain the OPO idler light and the OPO signal light. The OPO idler light and the OPO signal light are separated by the beam splitter. The filter M1 and the filter M2 are arranged in sequence, and the filter M1 is arranged behind the temperature control module. The filter M2 is arranged in front of the beam splitter.

Further, the third laser unit includes a fourth laser L4, a fifth laser L5, an optical fiber, and an optical coupler.

The poling fundamental frequency light is emitted by the fifth laser L5, enters the optical coupler through the optical fiber, and is then incident on the waveguide material through the optical fiber, so that the waveguide material produces a second-order nonlinear coefficient to generate the poling frequency doubled light by means of the second-order nonlinear effect, and the waveguide material produces a periodic second-order nonlinear coefficient under the combined action of the poling fundamental frequency light and the poling frequency doubled light. The OPO pump light is emitted by the fourth laser L4, enters the optical coupler through the optical fiber, and is then incident on the waveguide material through the optical fiber to generate the OPO signal light and the OPO idler light by means of the nonlinear effect of the waveguide material. The poling fundamental frequency light, the poling frequency doubled light, the OPO pump light, the OPO signal light, and the OPO idler light pass through the filter M1, the filter M2 and the filter M3 to filter the poling fundamental frequency light, the poling frequency doubled light and the OPO pump light, to obtain the OPO idler light and the OPO signal light. The OPO idler light and the OPO signal light are separated by the beam splitter. The filter M1, the filter M2 and the filter M3 are arranged in sequence, and the filter M1 is arranged behind the temperature control module. The filter M3 is arranged in front of the beam splitter.

Further, the fourth laser unit includes a sixth laser L6 and an optical fiber.

The poling fundamental frequency light is emitted by the sixth laser L6, and then incident on the waveguide material through the optical fiber, so that the waveguide material produces a second-order nonlinear coefficient to generate the poling frequency doubled light by means of the second-order nonlinear effect, and the waveguide material produces a periodic second-order nonlinear coefficient under the combined action of the poling fundamental frequency light and the poling frequency doubled light. The OPO pump light is emitted by the sixth laser L6, and then incident on the waveguide material through the optical fiber to generate the OPO signal light and the OPO idler light. The poling fundamental frequency light and the OPO pump light are filtered through the filter M1, and the poling frequency doubled light is filtered through the filter M2 to obtain the OPO idler light and the OPO signal light. The OPO idler light and the OPO signal light are separated by the beam splitter. The filter M1 and the filter M2 are arranged in sequence, and the filter M1 is arranged behind the temperature control module. The filter M2 is arranged in front of the beam splitter.

Further, the condition satisfied by the material producing the periodic second-order nonlinear coefficient and the poling laser light is expressed as follows:

$$3hv_f < E \leq 2hv_f + hv_{fd};$$

where, h represents the Planck constant, $v_f$ represents the frequency of the poling fundamental frequency light, E represents an energy difference from a defect center of the bulk material or the waveguide material to a conduction band, and $v_{fd}$ represents the frequency of the poling frequency doubled light;

the period of the periodic second-order nonlinear coefficient is expressed as follows:

$$\Lambda = \frac{\lambda_f}{2(n_{fd} - n_f)};$$

where, $\Lambda$ represents the period of the second-order nonlinear coefficient, $n_{fd}$ represents the refractive index of the poling frequency doubled light, $n_f$ represents the refractive index of the poling fundamental frequency light, and $\lambda_f$ represents the wavelength of the poling fundamental frequency light.

Further, the value range of the wavelength of the poling fundamental frequency light emitted by each of the second laser L2, the third laser L3, the fifth laser L5, and the sixth laser L6 is expressed as follows:

$$\frac{3hc}{E} < \lambda_f \le \frac{4hc}{E};$$

where, h represents the Planck constant, E represents the energy difference from the defect center of the bulk material or the waveguide material to the conduction band, c represents the speed of light, and $\lambda_f$ represents the wavelength of the poling fundamental frequency light.

The value range of the wavelength of the OPO pump light emitted by each of the third laser L3 and the sixth laser L6 is expressed as follows:

$$\frac{3hc}{E} < \lambda_p \le \frac{4hc}{E};$$

where, $\lambda_p$ represents the wavelength of the OPO pump light.

Further, the wavelength of the OPO pump light emitted by the first laser L1 is the light transmission range of the bulk material; and the wavelength of the OPO pump light emitted by the fourth laser L4 is the light transmission range of the waveguide material.

Further, the energy conservation and momentum conservation of the all-optical optical parametric oscillator satisfy the following conditions:

$$\frac{1}{\lambda_p} = \frac{1}{\lambda_s} + \frac{1}{\lambda_i};$$

$$\frac{2\pi n_p}{\lambda_p} - \frac{2\pi n_s}{\lambda_s} - \frac{2\pi n_i}{\lambda_i} - \frac{2\pi}{\Lambda} = 0;$$

where, $\lambda_p$ represents the wavelength of the OPO pump light, $\lambda_s$ represents the wavelength of the OPO signal light, $\lambda_i$ represents the wavelength of the OPO idler light, $n_p$ represents the refractive index of the OPO pump light, $n_s$ represents the refractive index of the OPO signal light, and $n_i$ represents the refractive index of the OPO idler light.

The advantages of the present invention are as follows:

(1) The present invention effectively uses the change of the wavelength of the poling fundamental frequency light, and uses the laser light with a wavelength in the range of $$\left(\frac{3hc}{E}, \frac{4hc}{E}\right]$$

to irradiate the quasi-phase-matched OPO material (the energy difference from the defect center to the conduction band is E), so as to dynamically convert the poled period of the quasi-phase-matched OPO nonlinear crystal.

(2) In the present invention, the quasi-phase-matched OPO nonlinear crystal is effectively poled by means of laser irradiation. When the wavelength of the irradiated laser light changes within the range of $$\left(\frac{3hc}{E}, \frac{4hc}{E}\right],$$

the OPO material (the energy difference from the defect center to the conduction band is E) will produce periodic poling.

(3) The present invention uses a waveguide with a photoinduced periodic structure as a nonlinear crystal of an optical parametric oscillator, which is easy to integrate into a silicon optical circuit.

(4) The present invention can change the temperature of the material by changing the temperature of the temperature control module to realize temperature tuning of the wavelength $\lambda_s$ of the OPO signal light and the wavelength $\lambda_i$ of the OPO idler light.

DETAILED DESCRIPTION OF THE EMBODIMENTS

The specific embodiments of the present invention are described below to help those skilled in the art understand the present invention, but it should be clear that the present invention is not limited to the scope of the specific embodiments. For those skilled in the art, as long as various changes are within the spirit and scope of the present invention defined by the appended claims, these changes are obvious, and all inventions and creations that use the concept of the present invention shall fall within the scope of the present invention.

Embodiment 1

Figure 2:
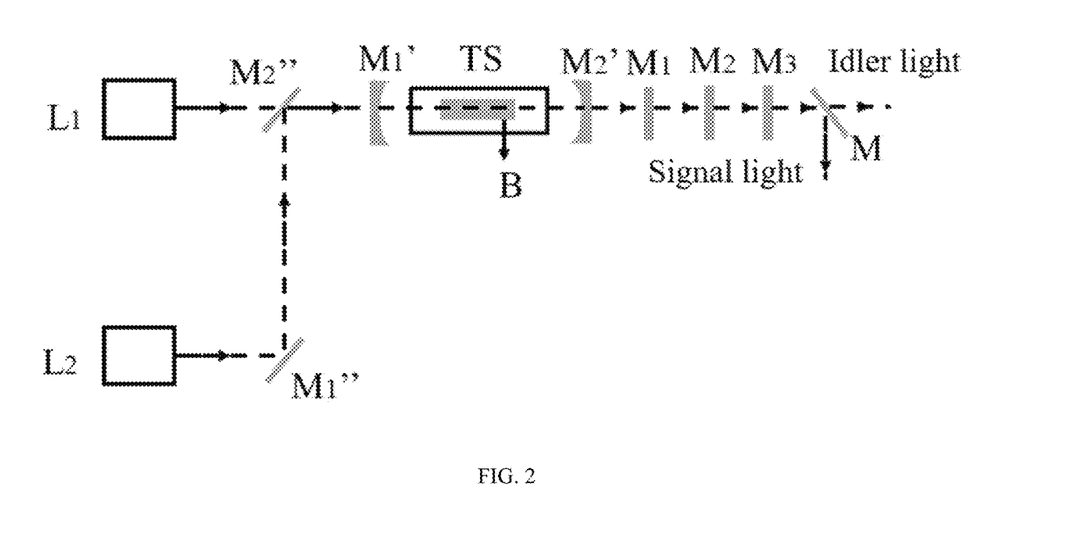
FIG. 2 is a schematic diagram of the structure of the all-optical optical parametric oscillator according to the present invention, in which a bulk material is used as the nonlinear material, and the poling fundamental frequency light and the OPO pump light are laser lights generated by different lasers.

As shown in FIG. 2, the present invention provides an all-optical optical parametric oscillator, including the laser module, the temperature control module TS, a plurality of filters and the beam splitter M. The bulk material B is arranged in the temperature control module TS. Both ends of the bulk material B are provided with the first OPO cavity mirror $M_1'$ and the second OPO cavity mirror $M_2'$, respectively. Each of the first OPO cavity mirror $M_1'$ and the second OPO cavity mirror $M_2'$ is coated with a high-reflectivity film with respect to the OPO signal light and the OPO idler light, and is coated with a high-transmittance film with respect to the OPO pump light, the poling fundamental frequency light and the poling frequency doubled light. The first laser unit includes the first laser L1, the second laser L2, the first reflector $M_1''$ and the second reflector $M_2''$. The poling fundamental frequency light is emitted by the second laser L2, and then incident on the bulk material through the first reflector $M_1''$ and the second reflector $M_2''$, so that the bulk material produces a second-order nonlinear coefficient to generate the poling frequency doubled light by means of the second-order nonlinear effect, and the material produces a periodic second-order nonlinear coefficient under the combined action of the poling fundamental frequency light and the poling frequency doubled light. The OPO pump light is emitted by the first laser L1, and then incident on the bulk material through the second reflector $M_2''$ to generate the OPO signal light and the OPO idler light by means of the nonlinear effect of the bulk material. The poling fundamental frequency light, the poling frequency doubled light, the OPO pump light, the OPO signal light, and the OPO idler light pass through the filter M1, the filter M2 and the filter M3 to filter the poling fundamental frequency light, the poling frequency doubled light and the OPO pump light, to obtain the OPO idler light and the OPO signal light. The OPO idler light and the OPO signal light are separated by the beam splitter. The filter M1, the filter M2 and the filter M3 are arranged in sequence, and the filter M1 is arranged behind the temperature control module TS. The third filter M3 is arranged in front of the beam splitter M.

In the present embodiment, FIG. 2 shows the structure of an all-optical optical parametric oscillator, in which a bulk material is used as the nonlinear material, and the poling fundamental frequency light and the OPO pump light are laser lights generated by different lasers. The poling fundamental frequency light is emitted by the second laser L2, and then incident on the bulk material through the first reflector $M_1''$ and the second reflector $M_2''$, so that the bulk material produces a second-order nonlinear coefficient to generate the poling frequency doubled light by means of the second-order nonlinear effect, and the material produces a periodic second-order nonlinear coefficient under the combined action of the poling fundamental frequency light and the poling frequency doubled light. The OPO pump light is emitted by the first laser L1, and then incident on the bulk material B to generate the OPO signal light and the OPO idler light. The bulk material B is placed in the temperature control module TS. Both ends of the bulk material B are provided with the first OPO cavity mirror $M_1'$ and the second OPO cavity mirror $M_2'$, respectively. Each of the first OPO cavity mirror and the second OPO cavity mirror is coated with a high-reflectivity film with respect to the OPO signal light and the OPO idler light, and is coated with a high-transmittance film with respect to the OPO pump light, the poling fundamental frequency light and the poling frequency doubled light. The laser lights emitted by the OPO mainly include the poling fundamental frequency light, the poling frequency doubled light, the OPO pump light, the OPO signal light and the OPO idler light. The filters M1, M2 and M3 are configured to filter out the poling fundamental frequency light, the poling frequency doubled light and the OPO pump light. The beam splitter M is configured to separate the OPO signal light and the OPO idler light.

In the present embodiment, the laser light output by each of the first laser L1 and the second laser L2 may be a single-wavelength laser light or a tunable laser light, a pulsed laser light or a continuous laser light.

Embodiment 2

Figure 3:
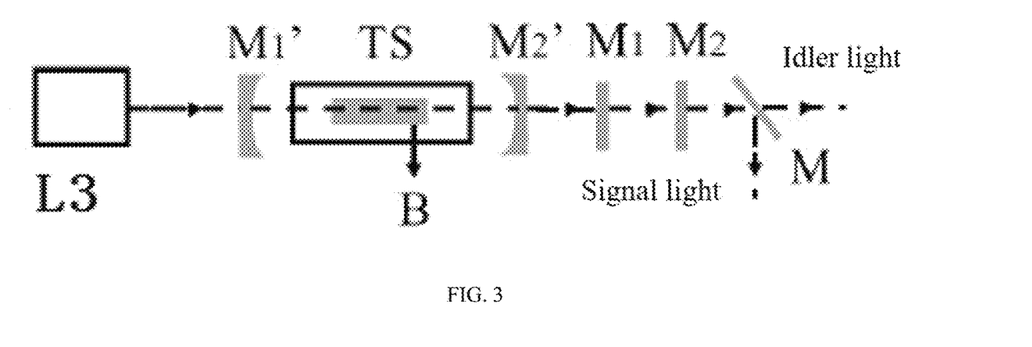
FIG. 3 is a schematic diagram of the structure of the all-optical optical parametric oscillator according to the present invention, in which a bulk material is used as the nonlinear material, and the poling fundamental frequency light and the OPO pump light are laser lights generated by the same laser.

As shown in FIG. 3, the present invention provides an all-optical optical parametric oscillator, including the laser module, the temperature control module TS, a plurality of filters and the beam splitter M arranged in sequence. The bulk material B is arranged in the temperature control module TS. Both ends of the bulk material B are provided with the first OPO cavity mirror $M_1'$ and the second OPO cavity mirror $M_2'$, respectively. Each of the first OPO cavity mirror $M_1'$ and the second OPO cavity mirror $M_2'$ is coated with a high-reflectivity film with respect to the OPO signal light and the OPO idler light, and is coated with a high-transmittance film with respect to the OPO pump light, the poling fundamental frequency light and the poling frequency doubled light. The second laser unit includes the third laser L3. The poling fundamental frequency light is emitted by the third laser L3, and then incident on the bulk material B, so that the bulk material produces a second-order nonlinear coefficient to generate the poling frequency doubled light by means of the second-order nonlinear effect, and the material produces a periodic second-order nonlinear coefficient under the combined action of the poling fundamental frequency light and the poling frequency doubled light. The OPO pump light is emitted by the third laser L3, and then incident on the bulk material B to generate the OPO signal light and the OPO idler light by means of the nonlinear effect of the bulk material B. The poling fundamental frequency light and the OPO pump light are filtered through the filter M1, and the poling frequency doubled light is filtered through the filter M2, to obtain the OPO idler light and the OPO signal light. The OPO idler light and the OPO signal light are separated by the beam splitter. The filter M1 and the filter M2 are arranged in sequence, and the filter M1 is arranged behind the temperature control module TS. The filter M2 is arranged in front of the beam splitter M.

In the present embodiment, FIG. 3 shows the structure of an all-optical optical parametric oscillator, in which the bulk material B is used as the nonlinear material, and the poling fundamental frequency light and the OPO pump light are laser lights generated by the same laser L3. The poling fundamental frequency light is emitted by the third laser L3, and then incident on the bulk material B, so that the bulk material produces a second-order nonlinear coefficient to generate the poling frequency doubled light by means of the second-order nonlinear effect, and the material produces a periodic second-order nonlinear coefficient under the combined action of the poling fundamental frequency light and the poling frequency doubled light. At the same time, the laser light emitted by the third laser L3 is also used as the OPO pump light to generate the OPO signal light and the OPO idler light. The bulk material B is placed in the temperature control module TS. Both ends of the bulk material B are provided with the first OPO cavity mirror $M_1'$ and the second OPO cavity mirror $M_2'$, respectively. Each of the first OPO cavity mirror $M_1'$ and the second OPO cavity mirror $M_2'$ is coated with a high-reflectivity film with respect to the OPO signal light and the OPO idler light, and is coated with a high-transmittance film with respect to the OPO pump light, the poling fundamental frequency light and the frequency doubled light. The laser lights emitted by the OPO mainly include the poling fundamental frequency light, the poling frequency doubled light, the OPO pump light, the OPO signal light and the OPO idler light. Among them, the poling fundamental frequency light and the OPO pump light have the same wavelength. The filter M1 is configured to filter out the poling fundamental frequency light and the OPO pump light, and the filter M2 is configured to filter out the poling frequency doubled light. The beam splitter M is configured to separate the OPO signal light and the OPO idler light.

In the present embodiment, the laser light output by the third laser L3 may be a single-wavelength laser light or a tunable laser light, a pulsed laser light or a continuous laser light.

Embodiment 3

Figure 4:
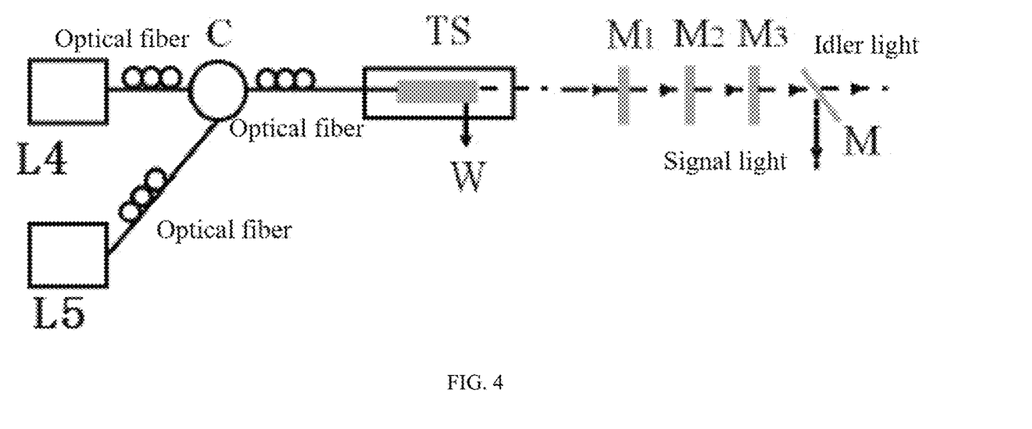
FIG. 4 is a schematic diagram of the structure of the all-optical optical parametric oscillator according to the present invention, in which a waveguide is used as the nonlinear material, and the poling fundamental frequency light and the OPO pump light are laser lights generated by different lasers.

As shown in FIG. 4, the present invention provides an all-optical optical parametric oscillator, including the laser module, the temperature control module TS, a plurality of filters and the beam splitter M arranged in sequence. The waveguide material W is arranged in the temperature control module TS. Each of both ends of the waveguide material W is coated with a high-reflectivity film with respect to the OPO signal light and the OPO idler light, and is coated with a high-transmittance film with respect to the OPO pump light, the poling fundamental frequency light and the poling frequency doubled light. The third laser unit includes the fourth laser L4, the fifth laser L5, the optical fiber and the optical coupler C. The poling fundamental frequency light is emitted by the fifth laser L5, enters the optical coupler C through the optical fiber, and is then incident on the waveguide material W through the optical fiber, so that the waveguide material produces a second-order nonlinear coefficient to generate the poling frequency doubled light by means of the second-order nonlinear effect, and the waveguide material produces a periodic second-order nonlinear coefficient under the combined action of the poling fundamental frequency light and the poling frequency doubled light. The OPO pump light is emitted by the fourth laser L4, enters the optical coupler C through the optical fiber, and is then incident on the waveguide material W through the optical fiber to generate the OPO signal light and the OPO idler light by means of the nonlinear effect of the waveguide material W. The poling fundamental frequency light, the poling frequency doubled light, the OPO pump light, the OPO signal light, and the OPO idler light pass through the filter M1, the filter M2 and the filter M3 to filter the poling fundamental frequency light, the poling frequency doubled light and the OPO pump light, to obtain the OPO idler light and the OPO signal light. The OPO idler light and the OPO signal light are separated by the beam splitter. The filter M1, the filter M2 and the filter M3 are arranged in sequence, and the filter M1 is arranged behind the temperature control module TS. The filter M3 is arranged in front of the beam splitter M.

In the present embodiment, the laser light output by each of the fourth laser L4 and the fifth laser L5 may be a single-wavelength laser light or a tunable laser light, a pulsed laser light or a continuous laser light.

In the present embodiment, FIG. 4 shows the structure of an all-optical optical parametric oscillator, in which a waveguide is used as the nonlinear material, and the poling fundamental frequency light and the OPO pump light are laser lights generated by different lasers. The poling fundamental frequency light emitted by the fifth laser L5 and the OPO pump light emitted by the fourth laser L4 enter the optical coupler C through the optical fiber, and then are incident on the waveguide material W through the optical fiber. The waveguide material produces a second-order nonlinear coefficient under the action of the poling fundamental frequency light emitted by the fifth laser L5, to generate the poling frequency doubled light by means of the second-order nonlinear effect, and the material produces a periodic second-order nonlinear coefficient under the combined action of the poling fundamental frequency light and the poling frequency doubled light. The OPO pump light emitted by the fourth laser L4 generates the OPO signal light and the OPO idler light by means of the nonlinear effect of the waveguide material W. The waveguide material W is placed in the temperature control module TS. Each of both ends of the waveguide material W is coated with a high-reflectivity film with respect to the OPO signal light and the OPO idler light, and is coated with a high-transmittance film with respect to the OPO pump light, the poling fundamental frequency light and the poling frequency doubled light. The laser lights emitted by the OPO mainly include the poling fundamental frequency light, the poling frequency doubled light, the OPO pump light, the OPO signal light and the OPO idler light. The filters M1, M2 and M3 are configured to filter out the poling fundamental frequency light, the poling frequency doubled light and the OPO pump light. The beam splitter M is configured to separate the OPO signal light and the OPO idler light.

Embodiment 4

Figure 5:
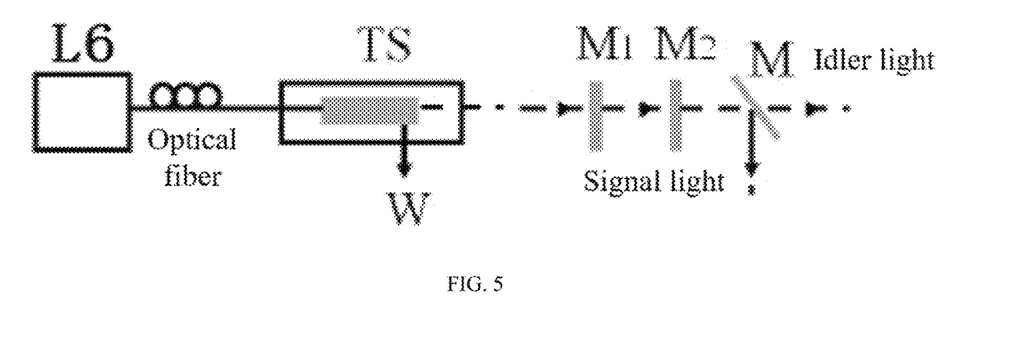
FIG. 5 is a schematic diagram of the structure of the all-optical optical parametric oscillator according to the present invention, in which a waveguide is used as the nonlinear material, and the poling fundamental frequency light and the OPO pump light are laser lights generated by the same laser.

As shown in FIG. 5, the present invention provides an all-optical optical parametric oscillator, including the laser module, the temperature control module TS, a plurality of filters and the beam splitter M arranged in sequence. The waveguide material W is arranged in the temperature control module TS. Each of both ends of the waveguide material W is coated with a high-reflectivity film with respect to the OPO signal light and the OPO idler light, and is coated with a high-transmittance film with respect to the OPO pump light, the poling fundamental frequency light and the poling frequency doubled light. The fourth laser unit includes the sixth laser L6 and the optical fiber. The poling fundamental frequency light is emitted by the sixth laser L6, and then incident on the waveguide material W through the optical fiber, so that the waveguide material produces a second-order nonlinear coefficient to generate the poling frequency doubled light by means of the second-order nonlinear effect, and the waveguide material produces a periodic second-order nonlinear coefficient under the combined action of the poling fundamental frequency light and the poling frequency doubled light. The OPO pump light is emitted by the sixth laser L6, and then incident on the waveguide material W through the optical fiber to generate the OPO signal light and the OPO idler light. The poling fundamental frequency light and the OPO pump light are filtered through the filter M1, and the poling frequency doubled light is filtered through the filter M2, to obtain the OPO idler light and the OPO signal light. The OPO idler light and the OPO signal light are separated by the beam splitter. The filter M1 and the filter M2 are arranged in sequence, and the filter M1 is arranged behind the temperature control module. The filter M2 is arranged in front of the beam splitter M.

In the present embodiment, FIG. 5 shows the structure of an all-optical optical parametric oscillator, in which a waveguide is used as the nonlinear material, and the poling fundamental frequency light and the OPO pump light are laser lights generated by the same laser. The poling fundamental frequency light is emitted by the sixth laser L6, and then incident on the waveguide material W through the optical fiber, so that the waveguide material produces a second-order nonlinear coefficient to generate the poling frequency doubled light by means of the second-order nonlinear effect, and the waveguide material produces a periodic second-order nonlinear coefficient under the combined action of the poling fundamental frequency light and the poling frequency doubled light. At the same time, the laser light emitted by the sixth laser L6 is also used as the OPO pump light to generate the OPO signal light and the OPO idler light. The waveguide material W is placed in the temperature control module TS. Each of both ends of the waveguide material W is coated with a high-reflectivity film with respect to the OPO signal light and the OPO idler light, and is coated with a high-transmittance film with respect to the OPO pump light, the poling fundamental frequency light and the poling frequency doubled light. The laser lights emitted by the OPO mainly include the poling fundamental frequency light, the poling frequency doubled light, the OPO pump light, the OPO signal light and the OPO idler light. Among them, the poling fundamental frequency light and the OPO pump light have the same wavelength. The filter M1 is configured to filter out the poling fundamental frequency light and the OPO pump light, and the filter M2 is configured to filter out the poling frequency doubled light. The beam splitter M is configured to separate the OPO signal light and the OPO idler light.

In the present embodiment, the laser light output by the sixth laser L6 may be a single-wavelength laser light or a tunable laser light, a pulsed laser light or a continuous laser light.

In the present embodiment, based on the foregoing Embodiment 1 to Embodiment 4, it can be seen that, compared with the device that generates the poling fundamental frequency light and the OPO pump light by different lasers, the device that generates the poling fundamental frequency light and the OPO pump light by the same laser has a simpler structure, but has a smaller variable range of the OPO signal light and the OPO idler light.

Figure 6:
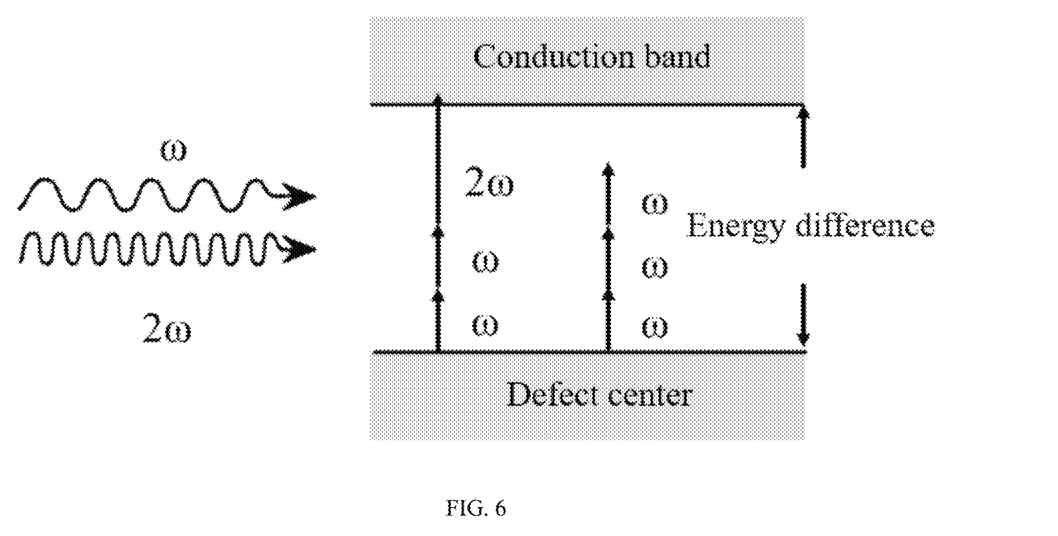
FIG. 6 is a schematic diagram of the multiphoton absorption of the material according to an embodiment.

In the present embodiment, based on the foregoing Embodiment 1 to Embodiment 4, whether the nonlinear material used in the OPO is the bulk material B or the waveguide material W, second-order nonlinearity will occur under strong laser irradiation. When the material has certain defect structures, these defect structures will produce a multiphoton absorption phenomenon under the strong laser irradiation, resulting in a coherent photocurrent effect. Under the photoconductive effect, the photocurrent will further form a built-in electric field that exists stably in the medium for a long time, thereby forming a spatial periodicity. Different energy differences from the defect center to the conduction band require different input laser energies to form a spatial periodic structure. When the sum of the photon energies of two poling fundamental frequency lights and one poling frequency doubled light is greater than the energy difference E from the defect center to the conduction band, and the sum of the energies of three poling fundamental frequency lights is less than the energy difference E from the defect center to the conduction band, that is, when the formula (1) is satisfied, the material can form a periodic second-order nonlinear coefficient for quasi-phase-matching, as shown in FIG. 6.

$$3h\nu_f < E \leq 2h\nu_f + h\nu_{fd} \quad (1);$$

where, h represents the Planck constant, $\nu_f$ represents the frequency of the poling fundamental frequency light, E represents the energy difference from the defect center of the bulk material or the waveguide material to the conduction band, and $\nu_{fd}$ represents the frequency of the poling frequency doubled light.

Figure 7:
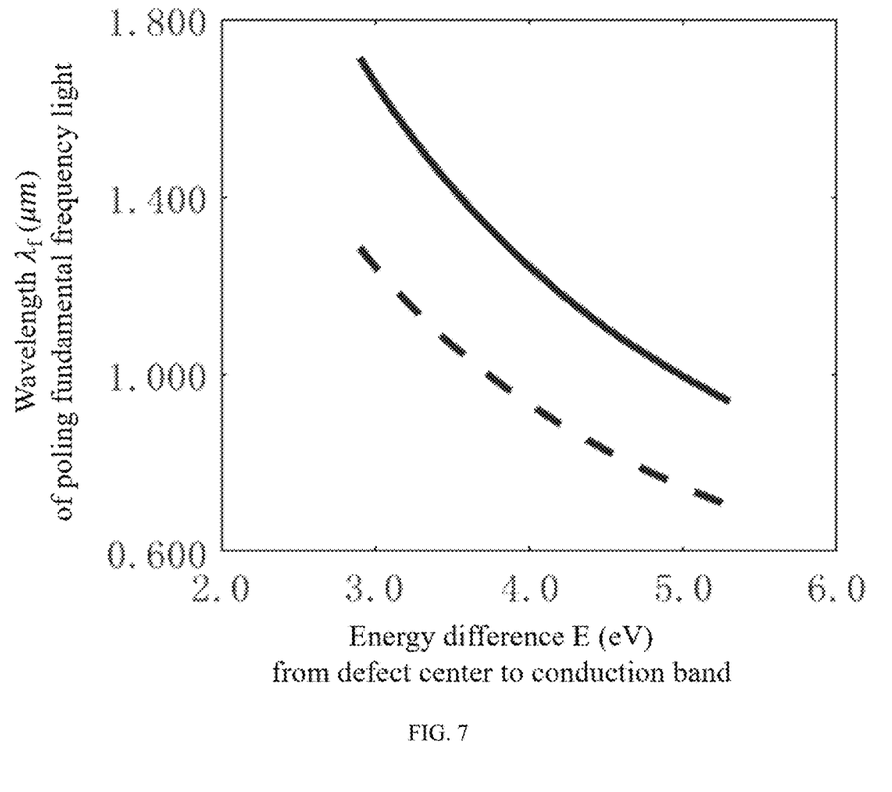
FIG. 7 is a graph showing the variation of the wavelength of the poling fundamental frequency light $\lambda_f$ with the energy difference E from the defect center to the conduction band according to an embodiment.

It can be seen from formula (1), the value range of the wavelength $\lambda_f$ of the poling fundamental frequency light emitted by each of the second laser L2, the third laser L3, the fifth laser L5, and the sixth laser L6 is as shown in formula (2):

$$\frac{3hc}{E} < \lambda_f \leq \frac{4hc}{E}; \quad (2)$$

where, h represents the Planck constant, E represents the energy difference from the defect center of the bulk material or the waveguide material to the conduction band, and c represents the speed of light, $\lambda_f$ represents the wavelength of the poling fundamental frequency light. FIG. 7 is a graph showing the variation of the wavelength $\lambda^f$ of the poling fundamental frequency light with the energy difference E from the defect center to the conduction band, where, the solid line represents the upper limit of the wavelength $\lambda_f$ of the poling fundamental frequency light, and the dashed line represents the lower limit of the wavelength $\lambda_f$ of the poling fundamental frequency light. It can be seen from this figure, as the energy difference E from the defect center to the conduction band increases from 2.9 eV to 5.3 eV, the upper limit of the wavelength $\lambda_f$ of the poling fundamental frequency light decreases from 1.714 μm to 0.938 μm, and the lower limit of the wavelength $\lambda_f$ of the poling fundamental frequency light decreases from 1.285 μm to 0.703 μm.

Figure 8:
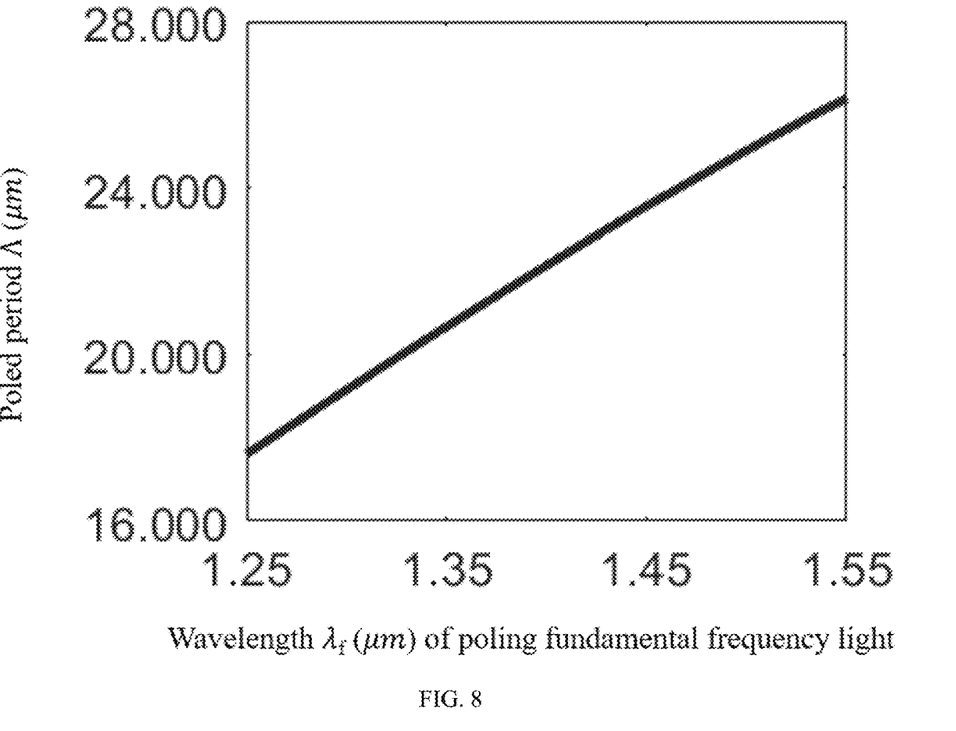
FIG. 8 is the graph showing the variation of the poled period $\Lambda$ of the silicon nitride waveguide material with the poling fundamental frequency light wavelength $\lambda_f$ according to an embodiment.

The period of the periodic second-order nonlinear coefficient is expressed as follows:

$$\Lambda = \frac{\lambda_f}{2(n_{fd} - n_f)}; \quad (3)$$

where, $\Lambda$ represents the period of the periodic second-order nonlinear coefficient, $n_{fd}$ represents the refractive index of the poling frequency doubled light, and $n_f$ represents the refractive index of the poling fundamental frequency light. Taking the silicon nitride waveguide as an example, the poled period $\Lambda$ of the material varies with the change of the wavelength $\lambda^f$ of the poling fundamental frequency light. As shown in FIG. 8, as the wavelength $\lambda_f$ of the poling fundamental frequency light increases from 1.25 μm to 1.55 μm, the poled period $\Lambda$ of the material increases from 17.6 μm to 26.16 μm.

In the present embodiment, based on the foregoing Embodiment 1 to Embodiment 4, the energy conservation and momentum conservation of the all-optical optical parametric oscillator satisfy the following conditions:

$$\frac{1}{\lambda_p} = \frac{1}{\lambda_s} + \frac{1}{\lambda_i} \quad (4)$$

$$\frac{2\pi n_p}{\lambda_p} - \frac{2\pi n_s}{\lambda_s} - \frac{2\pi n_i}{\lambda_i} - \frac{2\pi}{\Lambda} = 0; \quad (5)$$

where, $\lambda_p$ represents the wavelength of the OPO pump light, $\lambda_s$ represents the wavelength of the OPO signal light, $\lambda_i$ represents the wavelength of the OPO idler light, $n_p$ represents the refractive index of the OPO pump light, $n_s$ represents the refractive index of the OPO signal light, and $n_i$ represents the refractive index of the OPO idler light. By simultaneously solving the formulas (3), (4) and (5), the wavelength $\lambda_s$ of the OPO signal light and the wavelength $\lambda_i$ of the OPO idler light can be calculated.

In the present embodiment, based on the foregoing Embodiment 1 to Embodiment 4, for the device that generates the poling fundamental frequency light and the OPO pump light by different lasers, the wavelength $\lambda_p$ of the OPO pump light can be the wavelength in the entire light transmission range of the material. Namely, the wavelength of the OPO pump light emitted by the first laser L1 is the light transmission range of the bulk material, and the wavelength of the OPO pump light emitted by the fourth laser L4 is the light transmission range of the waveguide material. For the device that generates the poling fundamental frequency light and the OPO pump light by the same laser, the value range of the wavelength $\lambda_p$ of the OPO pump light is consistent with the value range of the wavelength $\lambda_f$ of the poling fundamental frequency light shown in formula (2), namely: the expression for the wavelength of the OPO pump light emitted by each of the third laser L3 and the sixth laser L6 is as follows:

$$\frac{3hc}{E} < \lambda_p \leq \frac{4hc}{E}.$$

Figure 9:
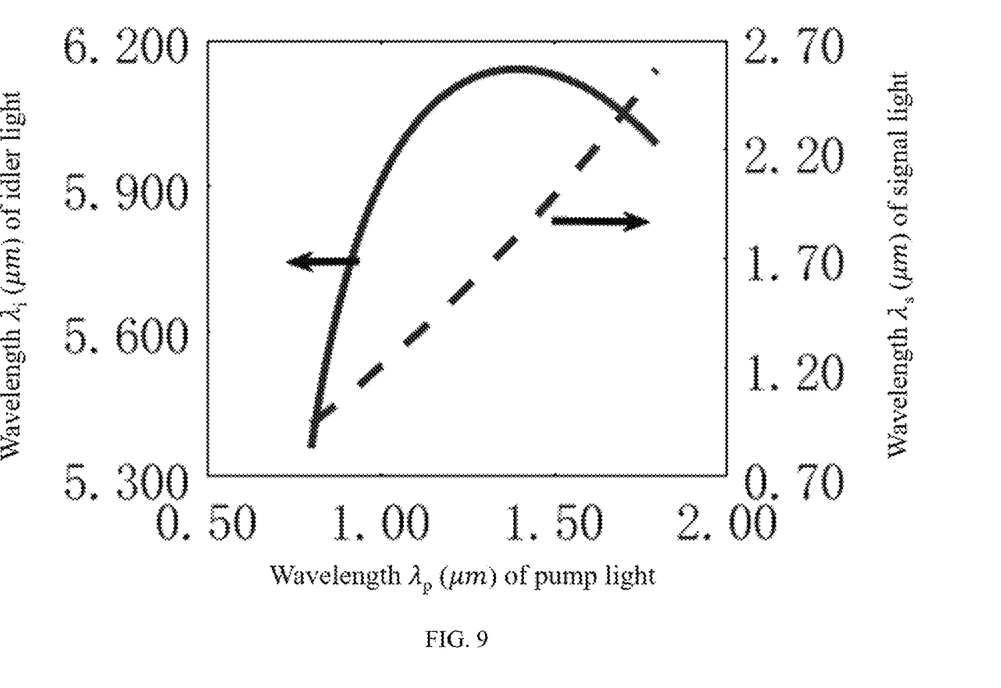
FIG. 9 is a graph showing the variation of the wavelength $\lambda_s$ of the OPO signal light and the wavelength $\lambda_i$ of the idler light with the wavelength $\lambda_p$ of the pump light when the wavelength $\lambda_f$ of the poling fundamental frequency light is 1350 nm according to an embodiment.
Figure 10:
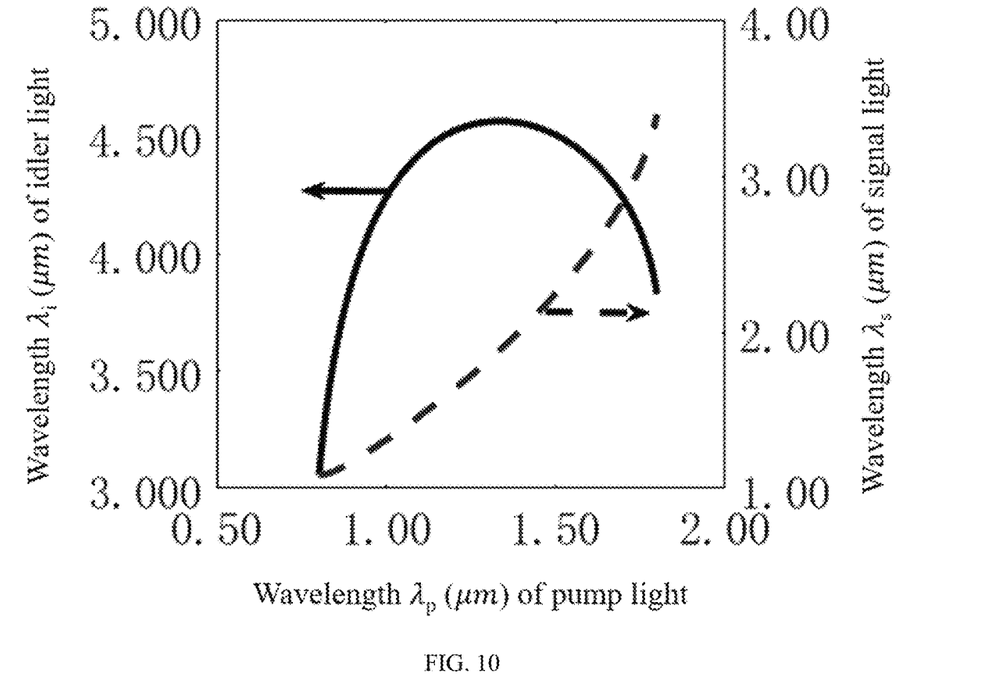
FIG. 10 is a graph showing the variation of the wavelength $\lambda_s$ of the OPO signal light and the wavelength $\lambda_i$ of the idler light with the wavelength $\lambda_p$ of the pump light when the wavelength $\lambda_f$ of the poling fundamental frequency light is 1550 nm according to an embodiment.

In the present embodiment, based on the foregoing Embodiment 1 to Embodiment 4, for the device that generates the poling fundamental frequency light and the OPO pump light by different lasers, when the wavelength $\lambda_f$ of the poling fundamental frequency light is fixed, the wavelength $\lambda_s$ of the OPO signal light and the wavelength $\lambda_i$ of the OPO idler light change with the wavelength $\lambda_p$ of the OPO pump light. Taking the silicon nitride waveguide as an example, for the device that generates the poling fundamental frequency light and the OPO pump light by different lasers, when the wavelength $\lambda_f$ of the poling fundamental frequency light is 1350 nm, the variation of the wavelength $\lambda_s$ of the OPO signal light and the wavelength $\lambda_i$ of the OPO idler light with the wavelength $\lambda_p$ of the pump light is shown in FIG. 9. When the wavelength $\lambda_f$ of the poling fundamental frequency light is 1350 nm, as the wavelength $\lambda_p$ of the OPO pump light increases from 0.8 μm to 1.8 μm, the wavelength $\lambda_s$ of the OPO signal light increases from 0.94 μm to 2.57 μm, and the wavelength $\lambda_i$ of the OPO idler light increases from 5.359 μm to 6.141 μm and then decreases to 5.985 μm. When the wavelength $\lambda_f$ of the poling fundamental frequency light is 1550 nm, the variation of the wavelength $\lambda_s$ of the OPO signal light and the wavelength $\lambda_i$ of the OPO idler light with the wavelength $\lambda_p$ of the pump light is shown in FIG. 10. As the wavelength $\lambda_p$ of the OPO pump light increases from 0.8 μm to 1.8 μm, the wavelength $\lambda_s$ of the OPO signal light increases from 1.08 μm to 3.39 μm, and the wavelength $\lambda_i$ of the OPO idler light increases from 3.057 μm to 4.566 μm and then decreases to 3.829 μm.

Figure 11:
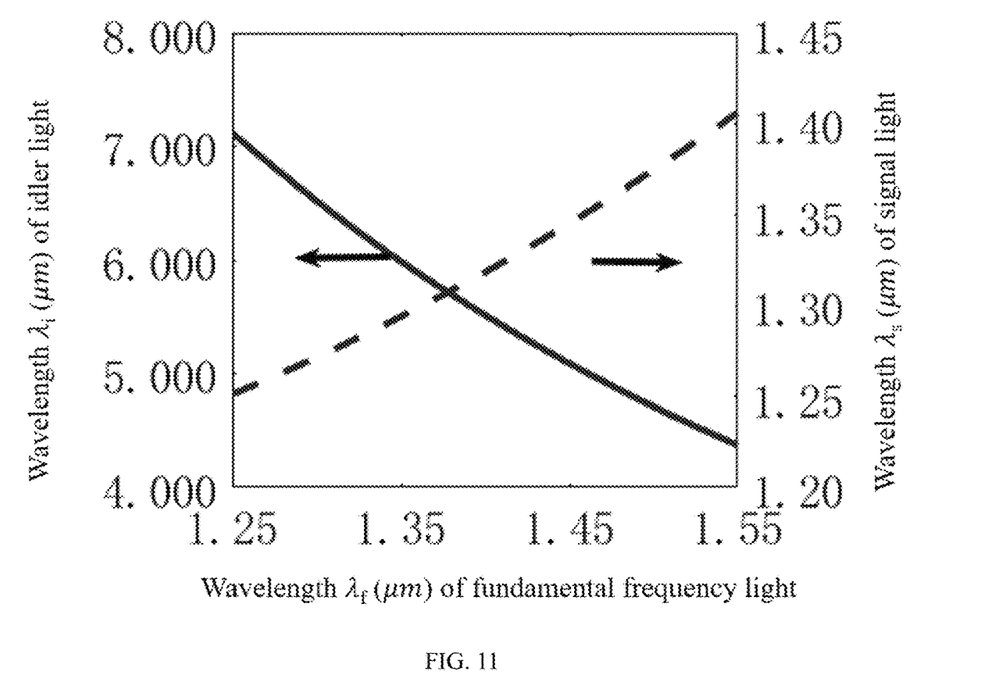
FIG. 11 is a graph showing the variation of the wavelength $\lambda_s$ of the OPO signal light and the wavelength $\lambda_i$ of the idler light with the wavelength $\lambda_f$ of the poling fundamental frequency light when the wavelength $\lambda_p$ of the OPO pump light is 1064 nm according to an embodiment.
Figure 12:
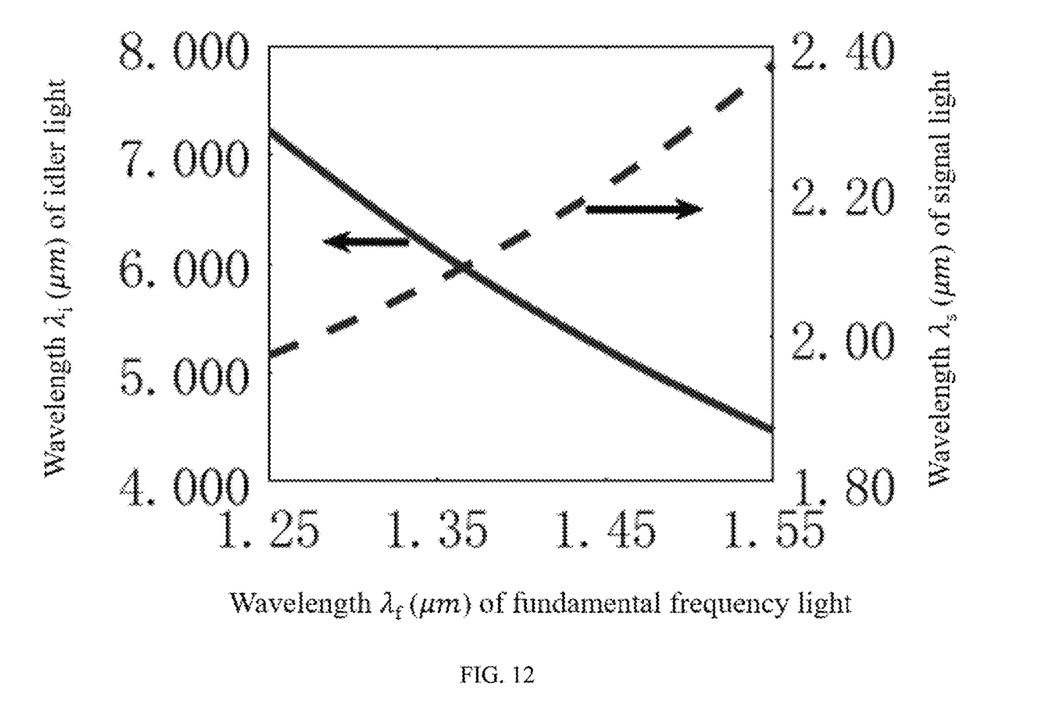
FIG. 12 is a graph showing the variation of the wavelength $\lambda_s$ of the OPO signal light and the wavelength $\lambda_i$ of the idler light with the wavelength $\lambda_f$ of the poling fundamental frequency light when the wavelength $\lambda_p$ of the OPO pump light is 1550 nm according to an embodiment.

In the present embodiment, based on the foregoing Embodiment 1 to Embodiment 4, for the device that generates the poling fundamental frequency light and the OPO pump light by different lasers, when the wavelength of the OPO pump light is fixed, as the wavelength $\lambda_f$ of the poling fundamental frequency light changes, the poled period of the material will change accordingly, which in turn causes the wavelength $\lambda_s$ of the OPO signal light and the wavelength $\lambda_i$ of the OPO idler light to change. Taking the silicon nitride waveguide as an example, for the device that generates the poling fundamental frequency light and the OPO pump light by different lasers, when the wavelength of the OPO pump light is fixed, as the wavelength $\lambda_f$ of the poling fundamental frequency light changes, the poled period of the material will change accordingly, which in turn causes the wavelength $\lambda_s$ of the OPO signal light and the wavelength $\lambda_i$ of the OPO idler light to change. When the wavelength $\lambda_p$ of the OPO pump light is 1064 nm, the variation of the wavelength $\lambda_s$ of the OPO signal light and the wavelength $\lambda_i$ of the OPO idler light with the wavelength $\lambda_f$ of the poling fundamental frequency light is shown in FIG. 11. As the wavelength $\lambda_f$ of the poling fundamental frequency light changes from 1.25 μm to 1.55 μm, the wavelength $\lambda_s$ of the OPO signal light changes from 1.251 μm to 1.406 μm, and the wavelength $\lambda_i$ of the OPO idler light changes from 7.114 μm to 4.372 μm. When the wavelength $\lambda_i$ of the OPO pump light is 1550 nm, the variation of the wavelength $\lambda_s$ of the OPO signal light and the wavelength $\lambda_i$ of the OPO idler light with the wavelength $\lambda_f$ of the poling fundamental frequency light is shown in FIG. 12. As the wavelength $\lambda_f$ of the poling fundamental frequency light changes from 1.25 μm to 1.55 μm, the wavelength $\lambda_s$ of the OPO signal light changes from 1.973 μm to 2.374 μm, and the wavelength $\lambda_i$ of the OPO idler light changes from 7.226 μm to 4.464 μm.

Figure 13:
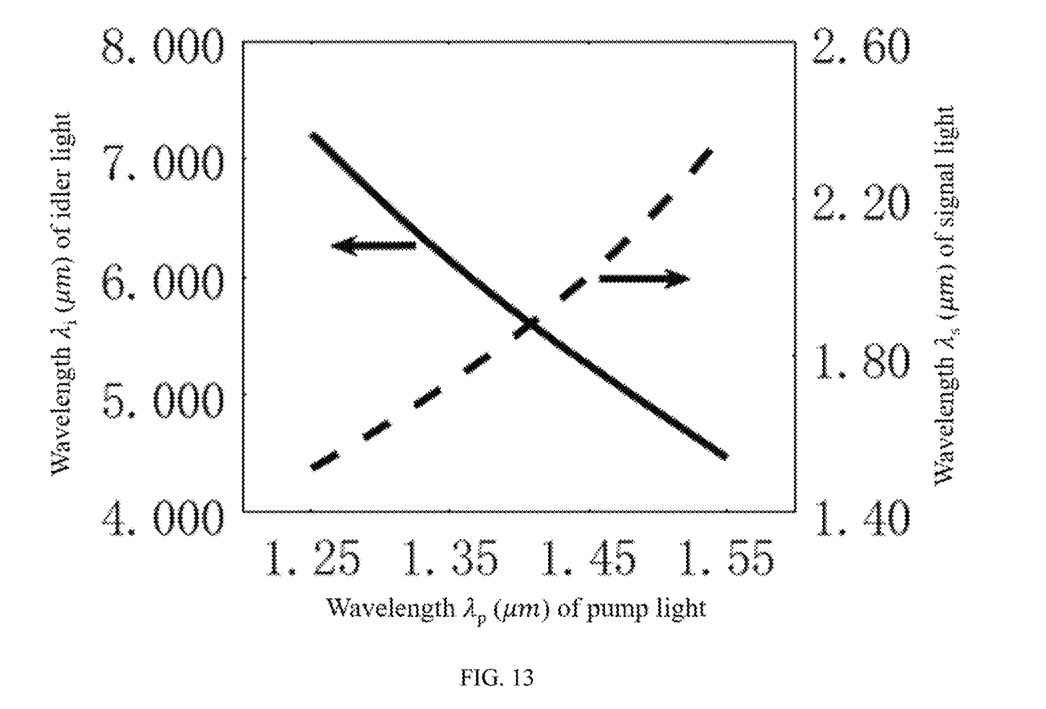
FIG. 13 is a graph showing the variation of the wavelength $\lambda_s$ of the OPO signal light and the wavelength $\lambda_i$ of the idler light with the wavelength of the OPO pump light $\lambda_p$ according to an embodiment.

In the present embodiment, based on the foregoing Embodiment 1 to Embodiment 4, for the device that generates the poling fundamental frequency light and the OPO pump light by the same laser, the poling fundamental frequency light and the OPO pump light have the same wavelength and have the same wavelength value range. The wavelength $\lambda_s$ of the OPO signal light and the wavelength $\lambda_i$ of the OPO idler light vary with the wavelength $\lambda_p$ of the pump light. Taking the silicon nitride waveguide as an example, for the device that generates the poling fundamental frequency light and the OPO pump light by the same laser, the poling fundamental frequency light and the OPO pump light have the same wavelength and have the same wavelength value range. The variation of the wavelength $\lambda_s$ of the OPO signal light and the wavelength $\lambda_i$ of the OPO idler light with the wavelength $\lambda_p$ of the pump light is shown in FIG. 13. As the wavelength $\lambda_p$ of the OPO pump light changes from 1.25 μm to 1.55 μm, the wavelength $\lambda_s$ of the OPO signal light increases from 1.51 μm to 2.37 μm, and the wavelength $\lambda_i$ of the OPO idler light changes from 7.213 μm to 4.465 μm.

By means of the above design, the present invention can change the temperature of the material by changing the temperature of the temperature control module to realize temperature tuning of the wavelength $\lambda_s$ of the OPO signal light and the wavelength $\lambda_i$ of the OPO idler light.

What is claimed is:

1. An all-optical optical parametric oscillator, comprising a laser module, a temperature control module, a plurality of filters and a beam splitter;
wherein
the laser module, the temperature control module, the plurality of filters and the beam splitter are arranged in sequence
a bulk material or a waveguide material is arranged in the temperature control module;
both ends of the bulk material are provided with a first OPO cavity mirror and a second OPO cavity mirror, respectively;
each of the first OPO cavity mirror and the second OPO cavity mirror is coated with a first high-reflectivity film with respect to an OPO signal light and an OPO idler light, and each of the first OPO cavity mirror and the second OPO cavity mirror is coated with a first high-transmittance film with respect to an OPO pump light, a poling fundamental frequency light and a poling frequency doubled light; and
each of both ends of the waveguide material is coated with a second high-reflectivity film with respect to the OPO signal light and the OPO idler light, and each of both ends of the waveguide material is coated with a second high-transmittance film with respect to the OPO pump light, the poling fundamental frequency light and the poling frequency doubled light.

2. The all-optical optical parametric oscillator according to claim 1, wherein,
the laser module is a first laser unit, a second laser unit, a third laser unit or a fourth laser unit.

3. The all-optical optical parametric oscillator according to claim 2, wherein,
the first laser unit comprises a first laser, a second laser, a first reflector, and a second reflector;
the poling fundamental frequency light is emitted by the second laser, and then the poling fundamental frequency light is incident on the bulk material through the first reflector and the second reflector, the bulk material produces a second-order nonlinear coefficient to generate the poling frequency doubled light by a second-order nonlinear effect, and the bulk material produces a periodic second-order nonlinear coefficient under a combined action of the poling fundamental frequency light and the poling frequency doubled light;
the OPO pump light is emitted by the first laser, and then the OPO pump light is incident on the bulk material through the second reflector to generate the OPO signal light and the OPO idler light by a nonlinear effect of the bulk material;
the poling fundamental frequency light, the poling frequency doubled light, the OPO pump light, the OPO signal light, and the OPO idler light pass through a first filter, a second filter and a third filter of the plurality of filters to filter the poling fundamental frequency light, the poling frequency doubled light and the OPO pump light, to obtain the OPO idler light and the OPO signal light;
the OPO idler light and the OPO signal light are separated by the beam splitter;
the first filter, the second filter and the third filter are arranged in sequence, and the first filter is arranged behind the temperature control module; and
the third filter is arranged in front of the beam splitter.

4. The all-optical optical parametric oscillator according to claim 2, wherein,
the second laser unit comprises a third laser;
the poling fundamental frequency light is emitted by the third laser, and then the poling fundamental frequency light is incident on the bulk material, the bulk material produces a second-order nonlinear coefficient to generate the poling frequency doubled light by a second-order nonlinear effect, and the bulk material produces a periodic second-order nonlinear coefficient under a combined action of the poling fundamental frequency light and the poling frequency doubled light;
the OPO pump light is emitted by the third laser, and then the OPO pump light is incident on the bulk material to generate the OPO signal light and the OPO idler light by a nonlinear effect of the bulk material;
the poling fundamental frequency light and the OPO pump light are filtered through a first filter of the plurality of filters, and the poling frequency doubled light is filtered through a second filter of the plurality of filters, to obtain the OPO idler light and the OPO signal light;

the OPO idler light and the OPO signal light are separated by the beam splitter;

the first filter and the second filter are arranged in sequence, and the first filter is arranged behind the temperature control module; and the second filter is arranged in front of the beam splitter.

5. The all-optical optical parametric oscillator according to claim 2, wherein, the third laser unit comprises a fourth laser, a fifth laser, a plurality of optical fibers, and an optical coupler;

the poling fundamental frequency light is emitted by the fifth laser, the poling fundamental frequency light enters the optical coupler through a first optical fiber of the plurality of optical fibers, and the poling fundamental frequency light is then incident on the waveguide material through a second optical fiber of the plurality of optical fibers, the waveguide material produces a second-order nonlinear coefficient to generate the poling frequency doubled light by a second-order nonlinear effect, and the waveguide material produces a periodic second-order nonlinear coefficient under a combined action of the poling fundamental frequency light and the poling frequency doubled light;

the OPO pump light is emitted by the fourth laser, the OPO pump light enters the optical coupler through a third optical fiber of the plurality of optical fibers, and the OPO pump light is then incident on the waveguide material through the second optical fiber to generate the OPO signal light and the OPO idler light by a nonlinear effect of the waveguide material;

the poling fundamental frequency light, the poling frequency doubled light, the OPO pump light, the OPO signal light, and the OPO idler light pass through a first filter of the plurality of filters, a second filter of the plurality of filters and a third filter of the plurality of filters to filter the poling fundamental frequency light, the poling frequency doubled light and the OPO pump light, to obtain the OPO idler light and the OPO signal light;

the OPO idler light and the OPO signal light are separated by the beam splitter;

the first filter, the second filter and the third filter are arranged in sequence, and the first filter is arranged behind the temperature control module; and the third filter is arranged in front of the beam splitter.

6. The all-optical optical parametric oscillator according to claim 2, wherein, the fourth laser unit comprises a sixth laser and an optical fiber;

the poling fundamental frequency light is emitted by the sixth laser, and then the poling fundamental frequency light is incident on the waveguide material through the optical fiber, the waveguide material produces a second-order nonlinear coefficient to generate the poling frequency doubled light by a second-order nonlinear effect, and the waveguide material produces a periodic second-order nonlinear coefficient under a combined action of the poling fundamental frequency light and the poling frequency doubled light;

the OPO pump light is emitted by the sixth laser, and then the OPO pump light is incident on the waveguide material through the optical fiber to generate the OPO signal light and the OPO idler light;

the poling fundamental frequency light and the OPO pump light are filtered through a first filter of the plurality of filters, and the poling frequency doubled light is filtered through a second filter of the plurality of filters, to obtain the OPO idler light and the OPO signal light;

the OPO idler light and the OPO signal light are separated by the beam splitter;

the first filter and the second filter are arranged in sequence, and the first filter is arranged behind the temperature control module; and the second filter is arranged in front of the beam splitter.

7. The all-optical optical parametric oscillator according to claim 3, wherein, a condition satisfied by the waveguide material, the poling fundamental frequency light and the poling frequency doubled light or a condition satisfied by the bulk material, the poling fundamental frequency light and the poling frequency doubled light is expressed as follows:

$$3hv_f < E \leq 2hv_f + hv_{fd};$$

wherein, h represents a Planck constant, $v_f$ represents a frequency of the poling fundamental frequency light, E represents an energy difference from a defect center of the bulk material or the waveguide material to a conduction band, and $v_{fd}$ represents a frequency of the poling frequency doubled light;

a period of the periodic second-order nonlinear coefficient is expressed as follows:

$$\Lambda = \frac{\lambda_f}{2(n_{fd} - n_f)};$$

wherein, $\Lambda$ represents the period of the second-order nonlinear coefficient, $n_{fd}$ represents a refractive index of the poling frequency doubled light, $n_f$ represents a refractive index of the poling fundamental frequency light, and $\lambda_f$ represents a wavelength of the poling fundamental frequency light.

8. The all-optical optical parametric oscillator according to claim 7, wherein, a value range of the wavelength of each of the poling fundamental frequency light emitted by the second laser, the poling fundamental frequency light emitted by a third laser, the poling fundamental frequency light emitted by a fifth laser and the poling fundamental frequency light emitted by a sixth laser is expressed as follows:

$$\frac{3hc}{E} < \lambda_f \leq \frac{4hc}{E};$$

wherein, h represents the Planck constant, E represents the energy difference from the defect center of the bulk material or the waveguide material to the conduction band, and c represents a speed of light, and $\lambda_f$ represents the wavelength of the poling fundamental frequency light;

a value range of a wavelength of each of the OPO pump light emitted by the third laser and the OPO pump light emitted by the sixth laser is expressed as follows:

$$\frac{3hc}{E} < \lambda_p \le \frac{4hc}{E};$$

wherein, $\lambda_p$ represents the wavelength of the OPO pump light.

9. The all-optical optical parametric oscillator according to claim 8, wherein,
the wavelength of the OPO pump light emitted by the first laser is a light transmission range of the bulk material; and
the wavelength of the OPO pump light emitted by the fourth laser is a light transmission range of the waveguide material.

10. The all-optical optical parametric oscillator according to claim 9, wherein,
energy conservation and momentum conservation of the all-optical optical parametric oscillator satisfy the following conditions:

$$\frac{1}{\lambda_p} = \frac{1}{\lambda_s} + \frac{1}{\lambda_i};$$

$$\frac{2\pi n_p}{\lambda_p} - \frac{2\pi n_s}{\lambda_s} - \frac{2\pi n_i}{\lambda_i} - \frac{2\pi}{\Lambda} = 0;$$

wherein, $\lambda_p$ represents the wavelength of the OPO pump light, $\lambda_s$ represents a wavelength of the OPO signal light, $\lambda_i$ represents a wavelength of the OPO idler light, $n_p$ represents a refractive index of the OPO pump light, $n_s$ represents a refractive index of the OPO signal light, and $n_i$ represents a refractive index of the OPO idler light.

11. The all-optical optical parametric oscillator according to claim 4, wherein,
a condition satisfied by the waveguide material, the poling fundamental frequency light and the poling frequency doubled light or a condition satisfied by the bulk material, the poling fundamental frequency light and the poling frequency doubled light is expressed as follows:

$$3hv_f < E \le 2hv_f + hv_{fd};$$

wherein, h represents a Planck constant, $v_f$ represents a frequency of the poling fundamental frequency light, E represents an energy difference from a defect center of the bulk material or the waveguide material to a conduction band, and $v_{fd}$ represents a frequency of the poling frequency doubled light;
a period of the periodic second-order nonlinear coefficient is expressed as follows:

$$\Lambda = \frac{\lambda_f}{2(n_{fd} - n_f)};$$

wherein, $\Lambda$ represents the period of the second-order nonlinear coefficient, $n_{fd}$ represents a refractive index of the poling frequency doubled light, $n_f$ represents a refractive index of the poling fundamental frequency light, and $\lambda_f$ represents a wavelength of the poling fundamental frequency light.

12. The all-optical optical parametric oscillator according to claim 5, wherein,
a condition satisfied by the waveguide material, the poling fundamental frequency light and the poling frequency doubled light or a condition satisfied by the bulk material, the poling fundamental frequency light and the poling frequency doubled light is expressed as follows:

$$3hv_f < E \le 2hv_f + hv_{fd};$$

wherein, h represents a Planck constant, $v_f$ represents a frequency of the poling fundamental frequency light, E represents an energy difference from a defect center of the bulk material or the waveguide material to a conduction band, and $v_{fd}$ represents a frequency of the poling frequency doubled light;
a period of the periodic second-order nonlinear coefficient is expressed as follows:

$$\Lambda = \frac{\lambda_f}{2(n_{fd} - n_f)};$$

wherein, $\Lambda$ represents the period of the second-order nonlinear coefficient, $n_{fd}$ represents a refractive index of the poling frequency doubled light, $n_f$ represents a refractive index of the poling fundamental frequency light, and $\lambda_f$ represents a wavelength of the poling fundamental frequency light.

13. The all-optical optical parametric oscillator according to claim 6, wherein,
a condition satisfied by the waveguide material, the poling fundamental frequency light and the poling frequency doubled light or a condition satisfied by the bulk material, the poling fundamental frequency light and the poling frequency doubled light is expressed as follows:

$$3hv_f < E \le 2hv_f + hv_{fd};$$

wherein, h represents a Planck constant, $v_f$ represents a frequency of the poling fundamental frequency light, E represents an energy difference from a defect center of the bulk material or the waveguide material to a conduction band, and $v_{fd}$ represents a frequency of the poling frequency doubled light;
a period of the periodic second-order nonlinear coefficient is expressed as follows:

$$\Lambda = \frac{\lambda_f}{2(n_{fd} - n_f)};$$

wherein, $\Lambda$ represents the period of the second-order nonlinear coefficient, $n_{fd}$ represents a refractive index of the poling frequency doubled light, $n_f$ represents a refractive index of the poling fundamental frequency light, and $\lambda_f$ represents a wavelength of the poling fundamental frequency light.

14. The all-optical optical parametric oscillator according to claim 11, wherein,
a value range of the wavelength of each of the poling fundamental frequency light emitted by a second laser, the poling fundamental frequency light emitted by the third laser, the poling fundamental frequency light emitted by a fifth laser and the poling fundamental frequency light emitted by a sixth laser is expressed as follows:

$$\frac{3hc}{E} < \lambda_f \leq \frac{4hc}{E};$$

wherein, h represents the Planck constant, E represents the energy difference from the defect center of the bulk material or the waveguide material to the conduction band, and c represents a speed of light, and $\lambda_f$ represents the wavelength of the poling fundamental frequency light;

a value range of a wavelength of each of the OPO pump light emitted by the third laser and the OPO pump light emitted by the sixth laser is expressed as follows:

$$\frac{3hc}{E} < \lambda_p \leq \frac{4hc}{E};$$

wherein, $\lambda_p$ represents the wavelength of the OPO pump light.

15. The all-optical optical parametric oscillator according to claim 12, wherein, a value range of the wavelength of each of the poling fundamental frequency light emitted by a second laser, the poling fundamental frequency light emitted by a third laser, the poling fundamental frequency light emitted by the fifth laser and the poling fundamental frequency light emitted by a sixth laser is expressed as follows:

$$\frac{3hc}{E} < \lambda_f \leq \frac{4hc}{E};$$

wherein, h represents the Planck constant, E represents the energy difference from the defect center of the bulk material or the waveguide material to the conduction band, and c represents a speed of light, and $\lambda_f$ represents the wavelength of the poling fundamental frequency light;

a value range of a wavelength of each of the OPO pump light emitted by the third laser and the OPO pump light emitted by the sixth laser is expressed as follows:

$$\frac{3hc}{E} < \lambda_p \leq \frac{4hc}{E};$$

wherein, $\lambda_p$ represents the wavelength of the OPO pump light.

16. The all-optical optical parametric oscillator according to claim 13, wherein, a value range of the wavelength of each of the poling fundamental frequency light emitted by a second laser, the poling fundamental frequency light emitted by a third laser, the poling fundamental frequency light emitted by a fifth laser and the poling fundamental frequency light emitted by the sixth laser is expressed as follows:

$$\frac{3hc}{E} < \lambda_f \leq \frac{4hc}{E};$$

wherein, h represents the Planck constant, E represents the energy difference from the defect center of the bulk material or the waveguide material to the conduction band, and c represents a speed of light, and $\lambda_f$ represents the wavelength of the poling fundamental frequency light;

a value range of a wavelength of each of the OPO pump light emitted by the third laser and the OPO pump light emitted by the sixth laser is expressed as follows:

$$\frac{3hc}{E} < \lambda_p \leq \frac{4hc}{E};$$

wherein, $\lambda_p$ represents the wavelength of the OPO pump light.

17. The all-optical optical parametric oscillator according to claim 14, wherein, the wavelength of the OPO pump light emitted by the first laser is a light transmission range of the bulk material; and the wavelength of the OPO pump light emitted by the fourth laser is a light transmission range of the waveguide material.

18. The all-optical optical parametric oscillator according to claim 15, wherein, the wavelength of the OPO pump light emitted by the first laser is a light transmission range of the bulk material; and the wavelength of the OPO pump light emitted by the fourth laser is a light transmission range of the waveguide material.

19. The all-optical optical parametric oscillator according to claim 16, wherein, the wavelength of the OPO pump light emitted by the first laser is a light transmission range of the bulk material; and the wavelength of the OPO pump light emitted by the fourth laser is a light transmission range of the waveguide material.

20. The all-optical optical parametric oscillator according to claim 17, wherein, energy conservation and momentum conservation of the all-optical optical parametric oscillator satisfy the following conditions:

$$\frac{1}{\lambda_p} = \frac{1}{\lambda_s} + \frac{1}{\lambda_i};$$

$$\frac{2\pi n_p}{\lambda_p} - \frac{2\pi n_s}{\lambda_s} - \frac{2\pi n_i}{\lambda_i} - \frac{2\pi}{\Lambda} = 0;$$

wherein, $\lambda_p$ represents the wavelength of the OPO pump light, $\lambda_s$ represents a wavelength of the OPO signal light, $\lambda_i$ represents a wavelength of the OPO idler light, $n_p$ represents a refractive index of the OPO pump light, $n_s$ represents a refractive index of the OPO signal light, and $n_i$ represents a refractive index of the OPO idler light.

* * * * *